United States Patent Office 3,032,552
Patented May 1, 1962

---

3,032,552
1-METHYL STEROIDS OF THE ANDROSTANE SERIES
Howard J. Ringold, Franz Sondheimer, and George Rosenkranz, Mexico City, Mexico, assignors to Syntex S.A., Mexico City, Mexico, a corporation of Mexico
No Drawing. Filed Apr. 5, 1955, Ser. No. 499,528
Claims priority, application Mexico Apr. 8, 1954
2 Claims. (Cl. 260—239.55)

The present invention relates to novel cyclopentanophenanthrene compounds and to a process for the production thereof.

More particularly, the present invention relates to the preparation of novel steroidal 1-methyl-19-nor-$\Delta^4$-3-ketones and especially compounds of the androstane series such as 1-methyl-nor-testosterone, 1-methyl-nor-androstenedione, 1-methyl-nor-methyl-testosterone and 1-methyl-nor-ethinyl-testosterone.

The novel compounds of the present invention are novel androgenic hormones having at least the anabolic activity characterizing testosterone and in some instances having enhanced or lesser androgenic effects.

In accordance with the present invention it has been discovered that 1-methyl-estrone and 1-methyl-estradiol, potent estrogens, described by Djerassi et al., J.A.C.S. 72, 4544 (1950), may be subjected to reduction in the form of their lower alkyl ethers to form novel 1-methyl-3-lower alkoxy-19-nor-$\Delta^{2,5(10)}$-androstadien-17$\beta$-ol intermediates. Hydrolysis and rearrangement of these intermediates in acid medium produced in turn the key intermediate and androgen 1-methyl-19-nor-$\Delta^4$-androsten-17$\beta$-ol-3-one (1-methyl-nor-testosterone). As hereinafter set forth in detail, there may be prepared from this last compound, in accordance with the present invention, the corresponding 3-ketal intermediates for the further preparation of the novel androgens 1-methyl-nor-methyl-testosterone and 1-methyl-nor ethinyl testosterone. There have further been prepared in accordance with the present invention, the novel androgen 1-methyl-nor-androstenedione and the enol ether thereof.

A portion of the process of the present invention involving the production of 1-methyl-nor-testosterone is outlined in the following equation:

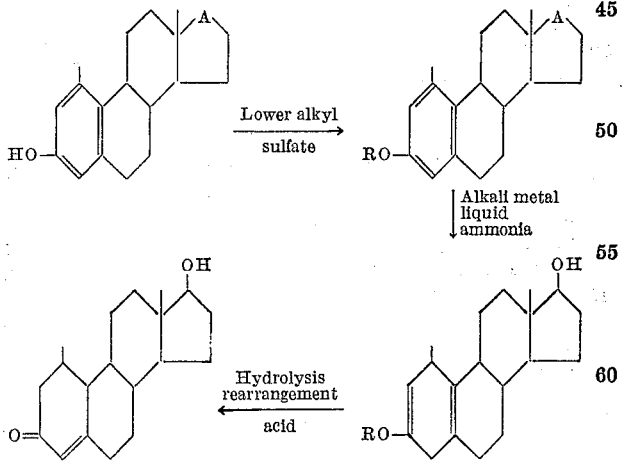

In the above formula A represents C=O or CH—OH and R represents a lower alkyl group such as methyl.

1-methyl estradiol or 1-methyl estrone prepared in accordance with the method disclosed in Djerassi et al., J.A.C.S. 72, 4544 et seq. (1950), were treated with a lower alkyl sulfate such as methyl sulfate in the presence of a base such as potassium hydroxide. The mixture is refluxed for a short period of time and poured into water. Upon neutralization and purification, there is produced the corresponding 3-lower alkyl ether of 1-methyl estradiol or 1-methyl estrone.

The lower alkyl ethers thus produced are then dissolved in an inert organic solvent such as Dowanol 33, methanol or ethanol. Other suitable solvents are ether solvents such as dioxane, tetrahydrofurane or ethyl ether having a small amount of a lower alcohol solvent added thereto. The cooled solution of the starting compound is then added to anhydrous ammonia and an alkali metal in the form of wire such as lithium or sodium is then added thereto. The solution is then stirred for a short period of time, i.e. of the order of one hour, diluted with water, and concentrated under vacuum. The cooled product is then extracted with an organic solvent such as benzene. The benzene solution is washed with water, dried and evaporated to dryness. The resultant product, i.e. the 1-methyl-3-lower alkoxy-19-nor-$\Delta^{2,5(10)}$-androstadiene-17$\beta$-ol thus prepared is then dissolved in a suitable solvent such as acetone and mixed with an acid such as p-toluenesulfonic acid. The mixture is then kept at room temperature for a relatively long period of time such as 15 hours, poured into water, extracted with ethyl acetate or other suitable solvent, washed with water, until neutral, dried over anhydrous sodium sulfate and evaporated to dryness under vacuum. The resultant compound was 1-methyl-19-nor-testosterone, a valuable androgenic hormone and key intermediate for further processing as indicated hereinafter.

Another portion of the process of the present invention is indicated in the following equation:

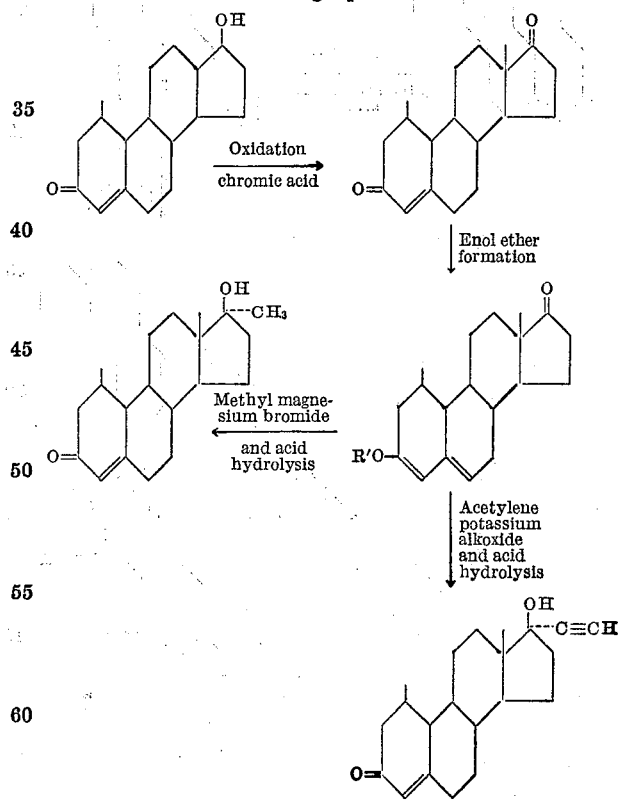

In the above equation $R^1$ represents a lower alkyl radical such as methyl or ethyl or a benzyl radical or any of the other groups conventionally used as part of an enol ether grouping for protection of the 3-keto function of steroids.

In practicing the steps of the process above-outlined the 1-methyl-19-nor-$\Delta^4$-androsten-17$\beta$-ol-3-one (1-methyl-nor-testosterone) is dissolved preferably in acetic acid and then added to a solution of chromic anhydride in water and acetic acid. The mixture is then kept for a period of time of approximately three hours at room temperature and poured into water. The precipitate is filtered and recrystallized from suitable solvents to give 1-methyl-19-nor-Δ⁴-androsten-3,17-dione.

The 3-keto group of the 1-methyl-nor-Δ⁴-androstene-3, 17-dione was protected for further steps in the process by forming a suitable enol ether thereof. The preferred method for making the enol ether is by treating the dione with ethylorthoformate as will be hereinafter described in detail. Upon purification there is obtained 1-methyl-19-nor-3-ethoxy-Δ³,⁵-androstadiene-17-one. This intermediate, the 3-enol ether, can be then treated either with a suitable methyl Grignard reagent such as methyl magnesium bromide in a solvent such as anhydrous ether followed by acidification with a suitable mineral acid such as hydrochloric acid to prepare the novel 1,17α-dimethyl-19-nor-Δ⁴-androstene-17β-ol-3-one or upon treatment of the enol ether with acetylene in the presence of an alkali metal alkoxide there is prepared the novel compound 1-methyl-19-nor-17α-ethinyl-Δ⁴-androstene-17β-ol 3-one.

A modified process for the production of 1-methyl-nor-methyl-testosterone and 1-methyl-nor-ethinyl-testosterone involves as novel intermediates the 3-ethylene ketal of 1-methyl-19-nor-testosterone and the 3-ethylene ketal of 1-methyl-19-nor-Δ⁴-androstene-dione. It may be noted, as indicated in the following equation, the exact position of the double bond attached to C-5 of the ketals has not been determined:

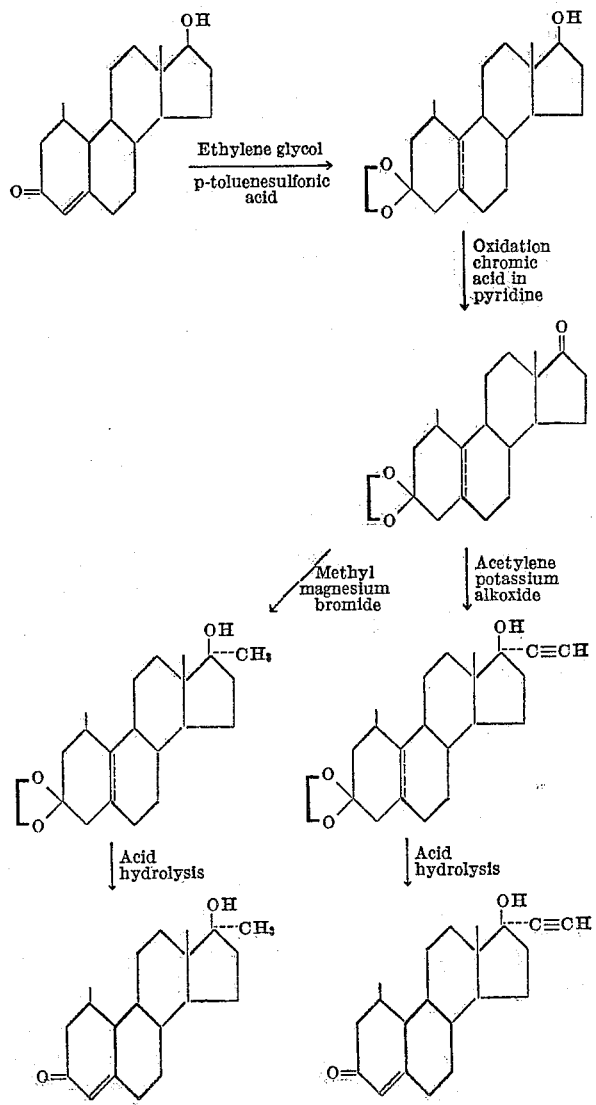

In practicing the steps above-outlined the 1-methyl-19-nor-Δ⁴-androstene-17β-ol-3-one (1-methyl-nor-testosterone) is reacted with ethylene glycol in the presence of an acid catalyst, preferably p-toluenesulfonic acid, in an inert organic solvent such as benzene. The reaction mixture is preferably refluxed for a relatively long period of time, of the order of one day, with continuous removal of the water formed during the reaction. Upon neutralization, as with sodium carbonate solution and washing, followed by drying and evaporation to dryness, there is produced the 3-ethylene ketal of 1-methyl-nor-testosterone.

The 3-ethylene ketal of 1-methyl-nor-testosterone prepared in accordance with the previous step is then oxidized with an oxidizing agent capable of oxidizing secondary hydroxyl groups to keto groups. Preferably the oxidizing agent utilized is chromic acid in pyridine. Relatively mild oxidizing conditions are utilized, as for example standing for approximately one day at room temperature. The reaction mixture is then diluted with an organic solvent such as ethyl acetate, filtered and the filtrate washed with water. The resultant solution is then dried and evaporated to dryness to give the 3-ethylene-ketal of 1-methyl-nor-androstene-dione. This intermediate, the 3-ketal, can then be treated either with a suitable methyl Grignard reagent, such as methyl magnesium bromide in a solvent such as anhydrous ether, followed by acidification with a suitable mineral acid such as hydrochloric acid to prepare the novel 1,17α-dimethyl-19-nor-Δ⁴-androstene-17β-ol-3-one, or the intermediate may be treated with acetylene in the presence of alkali metal alkoxide to prepare 1-methyl-19-nor-17α-ethinyl-Δ⁴-androstene-17β-ol-3-one.

The following specific examples serve to illustrate but are not intended to limit the present invention:

*Example I*

0.6 g. of 1-methyl-estradiol, prepared in accordance with the method of Djerassi et al. (J.A.C.S., 72, 4544 (1950)) was dissolved in 36 cc. of ethanol and then there was added alternately, in three portions each, a solution of 4.5 g. of potassium hydroxide in 4.5 cc. of water and then 4.5 cc. of methyl sulfate. The mixture was refluxed for two hours and then poured into water. After the addition of 2 cc. of concentrated hydrochloric acid, the precipitate was collected and washed with water until neutral. The residue was taken up in ether, washed with 10% sodium hydroxide and then with water until neutral, dried over anhydrous sodium sulfate, filtered and evaporated to dryness under vacuum, thus giving 0.325 g. of the 3-methyl ether of 1-methyl-estradiol.

*Example II*

0.325 g. of the 3-methyl ether of 1-methyl-estradiol was dissolved in 20 cc. of Dowanol 33 and the cooled solution was added to 35 cc. of anhydrous liquid ammonia. 0.5 g. of lithium metal in the form of wire was then added and the solution was stirred for one hour, diluted with water and concentrated under vacuum. The cooled product was extracted with benzene and the benzene solution was washed with water until neutral, dried over anhydrous sodium sulfate and evaporated to dryness under vacuum.

Alternatively, the above reaction can be carried out using methanol or ethanol instead of Dowanol 33. Also, some ether solvents can be used, such as dioxane, tetrahydrofurane or ethyl ether, in which case it is necessary to add small amounts of an alcoholic solvent. For solubility reasons we have preferred the use of Dowanol as solvent.

The reaction product was dissolved in 10 cc. of acetone and mixed with 0.25 g. of p-toluenesulfonic acid. The mixture was kept at room temperature for 15 hours, poured into water, extracted with ethyl acetate, washed with water until neutral, dried over anhydrous sodium sulfate and evaporated to dryness under vacuum. The 1-methyl-19-nor-testosterone thus obtained had a melting point of 202°–207° C. after one recrystallization.

*Example III*

0.6 g. of the methyl ether of 1-methyl-estrone (melting point 129°–132° C., obtained by methylation of 1-methyl-estrone by the method described in Example I) was treated exactly as described in Example II, thus yielding the same 1-methyl-nor-testosterone with an ultraviolet absorption maximum at 241 m$\mu$ (log $\epsilon$ 4.18).

*Example IV*

250 mg. of 1-methyl-nor-testosterone was dissolved in 10 cc. of acetic acid and added to a solution of 100 mg. of chromic anhydride in 0.33 cc. of water and 3 cc. of acetic acid. After keeping the mixture for three hours at room temperature, it was poured into water and the precipitate was filtered. Recrystallization from acetone-hexane afforded 1-methyl-nor-androstenedione (190 mg.), melting point 188°–192° C.

*Example V*

0.4 g. of pyridine hydrochloride was added to a solution of 2 g. of 1-methyl-19-nor-$\Delta^4$-androstene-3,17-dione (obtained in accordance with the method described in Example IV) in 50 cc. of benzene, thiophene free. A small amount of solvent was distilled in order to remove moisture and 4 cc. of absolute alcohol and 4 cc. of ethyl orthoformate were added and the mixture was refluxed for three hours. 5 cc. of the mixture was distilled, 4 additional cc. of ethyl orthoformate were added and the refluxing was continued for two hours further. The mixture was evaporated to dryness under vacuum and the residue was taken up in ether, washed, dried and evaporated to dryness. The residue was crystallized from acetone, hexane and then from ether to give 1-methyl-19-nor-3-ethoxy-$\Delta^{3,5}$-androstadien-17-one with an ultraviolet adsorption maximum at 242 m$\mu$ (log $\epsilon$ 4.35).

*Example VI*

A solution of 10 g. of methyl-magnesium bromide in 25 cc. of anhydrous ether was mixed with a solution of 1 g. of 1-methyl-19-nor-3-ethoxy-$\Delta^{3,5}$-androstadien-17-one in 10 cc. of anhydrous ether. The mixture was refluxed for two hours, poured into water and acidified with 50% hydrochloric acid to pH 1. After standing for one hour, the product was extracted with ether, washed to neutral, dried and evaporated to dryness. Crystallization from ether-hexane yielded 1,17$\alpha$-dimethyl-19-nor-$\Delta^4$-androsten-17$\beta$-ol-3-one.

*Example VII*

1 g. of potassium metal was dissolved in 25 cc. of anhydrous tertiary amyl alcohol under an atmosphere of nitrogen and with slight heating. A solution of 1 g. of 1-methyl-19-nor-3-ethoxy-$\Delta^{3,5}$-androstadien-17-one in 25 cc. of anhydrous toluene was then added and a stream of nitrogen was passed for 15 minutes, followed by pure dry acetylene overnight at room temperature and under mechanical stirring (14 hours). The mixture was poured into water and acidified with dilute hydrochloric acid to pH 1; it was then heated on the steam bath for 30 minutes and steam distilled in order to remove the organic solvents. The product was filtered, dried and crystallized from ethyl acetate, thus giving 1-methyl-19-nor-17$\alpha$-ethinyl-$\Delta^4$-androsten-17$\beta$-ol-3-one.

*Example VIII*

1 g. of 1-methyl-nor-testosterone, obtained in accordance with Example II was dissolved in 20 cc. of benzene and mixed with 4 cc. of ethylene glycol previously distilled over potassium hydroxide and 200 mg. of p-toluenesulfonic acid. The mixture was refluxed for 20 hours, using an adapter for the continuous removal of the water formed during the reaction. At the end of the 20 hours, the mixture was neutralized with saturated sodium bicarbonate solution, washed with water until neutral, dried over anhydrous sodium sulfate and evaporated to dryness under vacuum, thus yielding 1.1 g. of the ethylene-ketal of 1-methyl-nor-testosterone which was used without further purification for the experiment described in Example IX.

*Example IX*

A solution of 0.5 g. of the ethylene-ketal of 1-methyl-19-nor-testosterone in 3.5 cc. of anhydrous pyridine was added to a suspension of 0.5 g. of chromic acid in 3.5 cc. of anhydrous pyridine, previously prepared by adding the powdered chromic acid to the pyridine in four portions, until disappearance of the characteristic dark red color of chromic acid, and maintaining the temperature below 35° C. by cooling in ice. The mixture was kept for 20 hours at room temperature, diluted with ethyl acetate, filtered over Celite and the filtrate was washed with water until the washings were colorless. The solution was dried over anhydrous sodium sulfate and evaporated to dryness under vacuum, thus yielding 0.43 g. of the 3-ethylene-ketal of 1-methyl-nor-androstenedione which was used without further purification for the experiments described in Examples X and XI.

*Example X*

A solution of 1 g. of the 3-ethylene-ketal of 1-methyl-nor-androstenedione in 10 cc. of anhydrodous ether was treated in exactly the same way as described in Example VI, to give 1,17$\alpha$-dimethyl-19-nor-$\Delta^4$-androsten-17$\beta$-ol-3-one, identical to the one obtained in accordance with Example VI.

*Example XI*

A solution of 0.5 g. of the 3-ethylene-ketal of 1-methyl-19-nor-androstenedione, obtained in accordance with Example IX, in 12 cc. of anhydrous toluene was mixed with a solution of 0.5 g. of potassium metal in 12 cc. of tertiary amyl alcohol which had been prepared under an atmosphere of nitrogen, with slight heating. A stream of nitrogen was passed through the mixture for 15 minutes, followed by a stream of previously washed acetylene, for 15 hours. At the end of this period the mixture was poured into water, acidified with concentrated hydrochloric acid to pH 1, refluxed on the steam bath for 30 minutes and steam distilled in order to remove the solvents. The residue of the distillation was cooled in ice and the solid product was filtered (0.47 g.). Recrystallization from ethyl acetate and chromatography of the mother liquors in a column with washed alumina afforded 0.3 g. of 1-methyl-91-nor-ethinyl-testosterone, identical to the one obtained in accordance with Example VII.

We claim:
1. The 3-ethylene ketal of 1-methyl-19-nor-$\Delta^4$-androsten-17$\beta$-ol-3-one.
2. The 3-ethylene ketal of 1-methyl-19-nor-$\Delta^4$-androsten-3,17-dione.

References Cited in the file of this patent

UNITED STATES PATENTS

| | | |
|---|---|---|
| 2,280,828 | Inhoffen | Apr. 28, 1942 |
| 2,288,854 | Stavely | July 7, 1942 |
| 2,308,834 | Ruzicka et al. | Jan. 19, 1943 |
| 2,721,871 | Colton | Oct. 25, 1955 |
| 2,744,122 | Djerassi et al. | May 1, 1956 |

(Other references on following page)

UNITED STATES PATENTS

| | | |
|---|---|---|
| 2,774,777 | Djerassi et al. | Dec. 18, 1956 |
| 2,791,592 | Djerassi et al. | May 7, 1957 |
| 2,863,862 | Djerassi et al. | Dec. 9, 1958 |

OTHER REFERENCES

Marker et al.: J. Am. Chem. Soc., vol. 64 (1942), pages 1280–1281 (page 1280 necessary).

J.A.C.S., vol. 72, pages 4540–4 (1950).

Wilds et al.: J. Am. Chem. Soc., vol. 75 (November 5, 1953), pages 5366–5369.

Taub et al.: J. Am. Chem. Soc., vol. 80 (August 20, 1958), page 4435.

Robinson et al.: J. Am. Chem. Soc., vol. 81 (January 20, 1959) (pages 408–410, page 408 necessary).